Dec. 17, 1935.  D. BACHELIS  2,024,812
GLASS AND TUMBLER CLEANER AND WASHER
Filed March 13, 1935
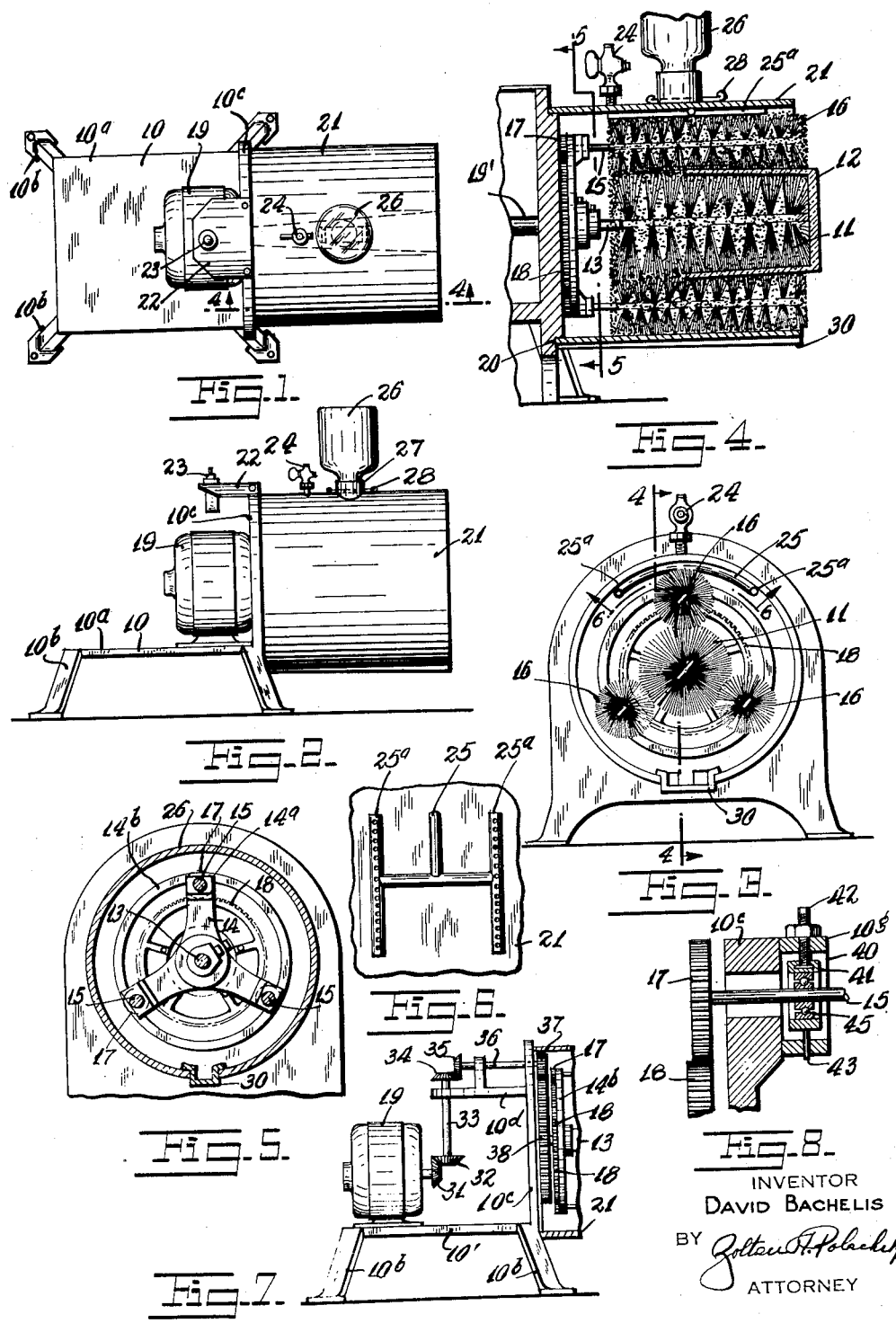
INVENTOR
DAVID BACHELIS
BY *Zoltan H. Polachek*
ATTORNEY Patented Dec. 17, 1935

2,024,812

UNITED STATES PATENT OFFICE 2,024,812

GLASS AND TUMBLER CLEANER AND WASHER

David Bachelis, New York, N. Y.

Application March 13, 1935, Serial No. 10,855

8 Claims. (Cl. 15—75)

This invention relates to new and useful improvements in a glass and tumbler cleaner and washer.

The invention has for an object the construction of a device as mentioned which is characterized by a main brush for engaging into a glass or tumbler and in peripheral contact with a plurality of auxiliary brushes in parallelism adapted to engage the outer sides of said glass or tumbler, when said latter article is forced upon said main brush, and a mechanism for rotating said brushes.

Still further the invention proposes an arrangement whereby the auxiliary brushes, in addition to rotating, travel around the outer surface of the glass or tumbler.

Another one of the objects of this invention is the provision of cleaning fluid and chemicals adapted to be discharged upon the brushes for assisting in cleaning the glass or tumbler.

Another of the objects of this invention is the provision of a master shank supporting the main brush, a plurality of auxiliary shanks supporting the auxiliary brushes, a spider rotative upon the master shank and supporting the auxiliary shanks, a gear fixed on the master shank, and a plurality of sun gears fixed upon the auxiliary shanks and meshing with the said gear.

Furthermore, the invention contemplates the provision of an arrangement whereby the auxiliary shanks may be radially adjusted relative to the master shank so as to compensate for the wear on the brushes after some use.

Another object of the invention is the construction of a device as described which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a plan view of a device constructed according to this invention.

Fig. 2 is a side elevational view of Fig. 1.

Fig. 3 is an end elevational view looking from the right hand end of Fig. 2.

Fig. 4 is a fragmentary sectional view taken on the line 4—4 of Fig. 3.

Fig. 5 is a fragmentary transverse sectional view taken on the line 5—5 of Fig. 4.

Fig. 6 is a fragmentary sectional view taken on the line 6—6 of Fig. 3.

Fig. 7 is a fragmentary elevational view of a device constructed according to another embodiment of the invention, a portion thereof being shown in section to illustrate interior parts.

Fig. 8 is a fragmentary longitudinal sectional view of mechanism for supporting the auxiliary shanks according to a modification of the invention by which the shanks may be radially adjusted relative to the master shank.

The glass and tumbler cleaner, according to this invention, includes a body 10, a brush 11 for engaging into a glass or tumbler 12, and having a shank 13 rotatively supported on the body 10.

A spider frame 14 is rotatively mounted on the master shank 13, and its arms rotatively support a plurality of auxiliary shanks 15 of brushes 16 arranged in parallelism with the brush 11 and in contact with the periphery thereof, and adapted to engage the outer sides of the glass or tumbler 12. Sun gears 17 are fixed upon the auxiliary shanks 15 and mesh with a large gear 18 fixed upon the master shank 13. An electric motor 19 is connected for driving the master shank 13.

The body 10 has a platform portion 10a supported by a plurality of feet 10b. The electric motor 19 is mounted on the platform 10a. The body 10 also includes a vertical wall 10c at one side through which a shaft 19' of the motor 19 extends so as to connect with the master shank 13. The wall 10c is formed with a shoulder 20 coaxial with the shank 13 and supporting a cylindrical shaped guard 21. This guard is open at the front end and of such length that the ends of the brushes 12 and 16 are exposed. A bracket 22 is mounted on the top of the wall 10c and supports an electric switch 23 in a circuit (not shown on the drawing) for controlling the operation of the motor 19.

A cock 24 is mounted upon the top of the guard 21 and is adapted to be connected with a supply of water. The cock 24 is fixed on the upper end of a pipe 25 which extends along the inner side of the guard 21 and connects with a pair of branch perforated pipe sections 25a disposed longitudinally of the guard 21 and over the brushes. The arrangement is such that the cock 24 controls a supply of water through the perforations and upon the brushes. A soap jar, or other chemical containing jar 26 is mounted on the top of the guard 21 and has its neck engaging a receiving socket 27 controlled with a manually operable valve 28 arranged to permit a controlled discharge of the chemical upon the brushes.

The arrangement is such that the chemicals will mix with the water and spread upon the brushes to aid in the cleansing of the glass or tumbler.

The spider 14 has a plurality of arms 14ᵃ in which the auxiliary shanks 15 are rotatively supported. Preferably, the rotative mounting should be accomplished with ball bearings, in a manner generally known. Annular ribs 14ᵇ connect the arms 14ᵃ for reinforcing the spider construction. The sun gears 17 are arranged against the back face of the spider 14 and between the spider and the wall 10ᶜ. A trough 30 is extended along the bottom of the guard 21 for accumulating the discharged water and guiding the water to a suitable receiving receptacle or sewage connection.

In Fig. 7 another embodiment of the invention has been disclosed which distinguishes from the previous form merely in the method of driving the device. According to this arrangement there is a gear system interposed between the motor 19 and the large gear 18. The motor is mounted upon the far side of the platform portion 10 and has a bevel gear 31 upon its shaft meshing with a bevel gear 32 upon a shaft 33 rotative in a projection 10ᵈ from the vertical wall 10ᶜ of the body 10′. A gear 34 is mounted upon the shaft 33 and meshes with a gear 35 on a shaft 36 rotatively supported on lugs from the projecting portion 10ᵈ. A gear 37 upon the shaft 36 meshes with a gear 38 fixed upon the master shank 13. The arrangement is such that rotations from the motor 19 will cause turning of the shank 13, and thereafter the operation of this form is identical to the previous form.

In Fig. 8 another embodiment of a modified form is shown in which the wall 10ᶜ supports a plurality of blocks 10ᵍ, one block for each of the auxiliary shanks 15. The blocks 10ᵍ are formed with radial slots 40 in which brackets 41 are located. Each bracket is supported by an adjustable stud 42 threadedly engaging the block. A guiding peg 43 projects from each bracket 41 and slidably engages in the opposite wall of the block 10ᵍ. A ball bearing 45 is mounted in each bracket 41 and supports the spindle 15. The sun gear 17 is fixed on the spindle 15 and meshes with the large gear 18.

In other respects this form of the invention is identical to the prior form. It distinguishes in the fact that the sun gear 17 may be removed, and the radial positions of the shank 15 adjusted by turning the screws 42. Proper sized gears may then be engaged upon the shank 15 so as to mesh with the gear 18. The arrangement is such that the auxiliary brushes 16 may be radially adjusted in their positions of parallelism to the main brush 12 so as to compensate for worn down bristles.

The operation of the device is as follows: A glass or tumbler may be cleaned by forcing it upon the free end of the brush 12, as shown in Fig. 4. It should be held in this position for a few seconds so as to permit rotations of the brush 12 to clean the inside thereof, and rotations and traveling of the brushes 16 to clean the outer sides. The cleaning fluid will coact with the brushing effect of the brushes to thoroughly clean the glass or tumbler. It may then be removed. The device is of exceptional value in stores dispensing drinks to the public.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A glass or tumbler cleaner and washer, comprising a body, a brush for engaging into a glass or tumbler and having a master shank at one end rotatively supported in said body, a master gear fixed on said master shank, a spider frame rotative on said master shank, a plurality of brushes parallel to said first mentioned brush and contacting therewith for engaging the outer sides of said glass or tumbler and having axial shanks at one end rotatively mounted in the arms of said spider frame, and sun gears fixed on said auxiliary shanks and meshing with said master gear.

2. A glass or tumbler cleaner and washer, comprising a body, a brush for engaging into a glass or tumbler and having a master shank at one end rotatively supported in said body, a master gear fixed on said master shank, a spider frame rotative on said master shank, a plurality of brushes parallel to said first mentioned brush and contacting therewith for engaging the outer sides of said glass or tumbler and having axial shanks at one end rotatively mounted in the arms of said spider frame, and sun gears fixed on said auxiliary shanks and meshing with said master gear, said body including a platform portion, a prime mover mounted on said platform portion and connected to rotate said master shank.

3. A glass or tumbler cleaner and washer, comprising a body, a brush for engaging into a glass or tumbler and having a master shank at one end rotatively supported in said body, a master gear fixed on said master shank, a spider frame rotative on said master shank, a plurality of brushes parallel to said first mentioned brush and contacting therewith for engaging the outer sides of said glass or tumbler and having axial shanks at one end rotatively mounted in the arms of said spider frame, and sun gears fixed on said auxiliary shanks and meshing with said master gear, and means for rotating the master shank.

4. A glass or tumbler cleaner and washer, comprising a body, a brush for engaging into a glass or tumbler and having a master shank at one end rotatively supported in said body, a master gear fixed on said master shank, a spider frame rotative on said master shank, a plurality of brushes parallel to said first mentioned brush and contacting therewith for engaging the outer sides of said glass or tumbler and having axial shanks at one end rotatively mounted in the arms of said spider frame, and sun gears fixed on said auxiliary shanks and meshing with said master gear, said gears being located between the spider frame and a side wall of said body.

5. A glass or tumbler cleaner and washer, comprising a body, a brush for engaging into a glass or tumbler and having a master shank at one end rotatively supported in said body, a master gear fixed on said master shank, a spider frame rotative on said master shank, a plurality of brushes parallel to said first mentioned brush and contacting therewith for engaging the outer sides of said glass or tumbler and having axial shanks at one end rotatively mounted in the arms of said spider frame, and sun gears fixed on said auxiliary shanks and meshing with said master gear, said gears being located between the spider frame and a side wall of said body, said side wall having its face formed with an annular shoulder, and a cylindrical shaped guard mounted on said annular shoulder.

6. A glass or tumbler cleaner and washer, comprising a body, a brush for engaging into a glass or tumbler and having a master shank at one end rotatively supported in said body, a master gear fixed on said master shank, a spider frame rotative on said master shank, a plurality of brushes parallel to said first mentioned brush and contacting therewith for engaging the outer sides of said glass or tumbler and having axial shanks at one end rotatively mounted in the arms of said spider frame, and sun gears fixed on said auxiliary shanks and meshing with said gear, said gears being located between the spider frame and a side wall of said body, said side wall having its face formed with an annular shoulder, and a cylindrical shaped guard mounted on said annular shoulder, means for supplying cleaning fluid mounted on said guard at the top thereof and adapted to discharge upon the brushes, and a trough extended along the bottom of said guard.

7. A glass or tumbler cleaner and washer, comprising a body, a brush for engaging into a glass or tumbler and having a master shank at one end rotatively supported in said body, a master gear fixed on said master shank, a spider frame rotative on said master shank, a plurality of brushes parallel to said first mentioned brush and contacting therewith for engaging the outer sides of said glass or tumbler and having axial shanks at one end rotatively mounted in the arms of said spider frame, sun gears fixed on said auxiliary shanks and meshing with said master gear, and mechanism for adjusting the radial position of the auxiliary shanks to the master shank whereby different sun gears may be substituted for other sun gears in adjusted positions, to mesh with the said master gear.

8. A glass or tumbler cleaner and washer, comprising a body, a brush for engaging into a glass or tumbler and having a master shank at one end rotatively supported in said body, a master gear fixed on said master shank, a spider frame rotative on said master shank, a plurality of brushes parallel to said first mentioned brush and contacting therewith for engaging the outer sides of said glass or tumbler and having axial shanks at one end rotatively mounted in the arms of said spider frame, sun gears fixed on said auxiliary shanks and meshing with said master gear, and mechanism for adjusting the radial position of the auxiliary shanks to the master shank whereby different sun gears may be substituted for other sun gears in adjusted positions, to mesh with the said master gear, the radial adjustment means comprising bearings supporting the shanks and mounted in blocks adjustably supported radially upon the spider frame.

DAVID BACHELIS.